(12) United States Patent
Lord

(10) Patent No.: US 11,647,793 B2
(45) Date of Patent: May 16, 2023

(54) ELECTRONIC VAPOR PROVISION DEVICE

(71) Applicant: NICOVENTURES TRADING LIMITED, London (GB)

(72) Inventor: Christopher Lord, London (GB)

(73) Assignee: Nicoventures Trading Limited, London (GB)

( * ) Notice: Subject to any disclaimer, the term of this patent is extended or adjusted under 35 U.S.C. 154(b) by 0 days.

(21) Appl. No.: 14/432,697

(22) PCT Filed: Oct. 9, 2013

(86) PCT No.: PCT/EP2013/071069
§ 371 (c)(1),
(2) Date: Mar. 31, 2015

(87) PCT Pub. No.: WO2014/060267
PCT Pub. Date: Apr. 24, 2014

(65) Prior Publication Data
US 2015/0237917 A1 Aug. 27, 2015

(30) Foreign Application Priority Data
Oct. 19, 2012 (GB) ...................................... 1218816

(51) Int. Cl.
| | |
|---|---|
| *A24F 40/51* | (2020.01) |
| *G01K 1/20* | (2006.01) |
| *G01L 19/04* | (2006.01) |
| *A24F 40/10* | (2020.01) |

(52) U.S. Cl.
CPC ................ *A24F 40/51* (2020.01); *G01K 1/20* (2013.01); *G01L 19/04* (2013.01); *A24F 40/10* (2020.01)

(58) Field of Classification Search
None
See application file for complete search history.

(56) References Cited

U.S. PATENT DOCUMENTS

| | | | | |
|---|---|---|---|---|
| 4,358,665 A | * | 11/1982 | Owen ..................... | F24H 1/102 219/523 |
| 4,523,084 A | * | 6/1985 | Tamura .............. | G05D 23/2401 219/497 |
| 4,947,874 A | * | 8/1990 | Brooks ................. | A24F 47/008 128/202.21 |
| 5,095,921 A | | 3/1992 | Losee | |
| 5,372,148 A | | 12/1994 | McCafferty | |

(Continued)

FOREIGN PATENT DOCUMENTS

| | | |
|---|---|---|
| CN | 1500546 A | 6/2004 |
| CN | 101522244 A | 9/2009 |

(Continued)

OTHER PUBLICATIONS

Lu et al. (Photonic Crystal Based All-Optical Pressure Sensor, 2013) (Year: 2013).*

(Continued)

*Primary Examiner* — Phu H Nguyen
(74) *Attorney, Agent, or Firm* — Patterson Thuente, P.A.

(57) ABSTRACT

An electronic vapor provision device comprising a power cell and a computer, where the computer comprises a computer processor, a memory and an input-output means; wherein the device further comprises a pressure sensor and a temperature sensor.

26 Claims, 5 Drawing Sheets

(56) References Cited

U.S. PATENT DOCUMENTS

| | | | |
|---|---|---|---|
| 5,434,386 A * | 7/1995 | Glenn | H05B 1/0283 219/220 |
| 5,613,505 A | 3/1997 | Campbell et al. | |
| 5,878,752 A | 3/1999 | Adams et al. | |
| 5,894,841 A | 4/1999 | Voges | |
| 6,615,840 B1 | 9/2003 | Fournier et al. | |
| 6,766,220 B2 | 7/2004 | McRae | |
| 7,147,170 B2 | 12/2006 | Nguyen | |
| 8,079,371 B2 | 12/2011 | Robinson | |
| 2004/0081624 A1 | 4/2004 | Nguyen | |
| 2005/0274193 A1 | 12/2005 | Kwon | |
| 2007/0045288 A1 | 3/2007 | Nelson | |
| 2007/0074734 A1 | 4/2007 | Michaels | |
| 2007/0113665 A1 * | 5/2007 | Johnson | G01L 9/0054 73/721 |
| 2009/0095312 A1 | 4/2009 | Herbrich et al. | |
| 2010/0024517 A1 * | 2/2010 | Ratner | G01L 15/00 73/1.57 |
| 2010/0236546 A1 | 9/2010 | Yamada | |
| 2010/0242974 A1 | 9/2010 | Pan | |
| 2011/0226236 A1 | 9/2011 | Buchberger | |
| 2011/0265806 A1 | 11/2011 | Alarcon | |
| 2012/0048266 A1 * | 3/2012 | Alelov | A61M 11/005 128/202.21 |
| 2012/0227752 A1 | 9/2012 | Alelov | |
| 2012/0234821 A1 | 9/2012 | Kazuhiko | |
| 2012/0242974 A1 | 9/2012 | LaValley et al. | |
| 2012/0298220 A1 | 11/2012 | Hidaka | |
| 2014/0299125 A1 * | 10/2014 | Buchberger | A61M 11/041 128/202.21 |
| 2015/0136153 A1 | 5/2015 | Lord | |
| 2015/0245660 A1 | 9/2015 | Lord | |
| 2015/0257448 A1 | 9/2015 | Lord | |
| 2016/0242466 A1 | 8/2016 | Lord | |
| 2017/0035114 A1 | 2/2017 | Lord | |
| 2017/0055583 A1 | 3/2017 | Blandino et al. | |
| 2017/0340016 A1 | 11/2017 | Thorens | |
| 2017/0340017 A1 | 11/2017 | Thorens | |
| 2018/0007972 A1 | 1/2018 | Thorens | |
| 2018/0192700 A1 | 7/2018 | Fraser et al. | |
| 2018/0214645 A1 | 8/2018 | Reevell | |
| 2018/0242642 A1 | 8/2018 | Silvesstrini et al. | |
| 2018/0279681 A1 | 10/2018 | Rojo-Calderon et al. | |
| 2018/0310623 A1 | 11/2018 | Batista | |
| 2019/0380391 A1 | 12/2019 | Reevell | |
| 2020/0000148 A1 | 1/2020 | Horrod et al. | |
| 2020/0022412 A1 | 1/2020 | Abi Aoun et al. | |
| 2020/0037402 A1 | 1/2020 | Abi Aoun et al. | |
| 2020/0163384 A1 | 5/2020 | Rossoll et al. | |
| 2020/0214350 A1 | 7/2020 | Courbat et al. | |
| 2020/0221772 A1 | 7/2020 | Mironov et al. | |
| 2022/0183368 A1 | 6/2022 | Abi Aoun et al. | |

FOREIGN PATENT DOCUMENTS

| | | |
|---|---|---|
| CN | 101524187 A | 9/2009 |
| CN | 100566769 C | 12/2009 |
| CN | 201830899 U | 5/2011 |
| CN | 102322893 A | 1/2012 |
| CN | 202364801 U | 8/2012 |
| CN | 203952405 U | 11/2014 |
| CN | 104544570 A | 4/2015 |
| CN | 107949288 A | 4/2018 |
| CN | 108348004 A | 7/2018 |
| CN | 108783613 A | 11/2018 |
| CN | 109330030 A | 2/2019 |
| DE | 102009035973 A1 | 4/2011 |
| EP | 0430559 A | 6/1991 |
| EP | 1785711 A2 | 5/2007 |
| EP | 1989946 A1 | 11/2008 |
| EP | 2047880 A1 | 4/2009 |
| EP | 2119375 | 11/2009 |
| EP | 2340730 | 7/2011 |
| EP | 2468118 A1 | 6/2012 |
| EP | 2908673 A2 | 8/2015 |
| EP | 3636084 A1 | 4/2020 |
| GB | 2507102 B | 12/2015 |
| JP | S56-040917 | 4/1981 |
| JP | H02124082 A | 5/1990 |
| JP | H06-009233 U | 1/1994 |
| JP | H08511966 A | 12/1996 |
| JP | H11-002577 | 1/1999 |
| JP | 2000-132654 | 5/2000 |
| JP | 3392138 B2 | 3/2003 |
| JP | 2004-177579 | 6/2004 |
| JP | 2005538159 | 12/2005 |
| JP | 2007192802 A | 8/2007 |
| JP | 2008-165769 | 7/2008 |
| JP | 2009525746 A | 7/2009 |
| JP | 2010526553 A | 8/2010 |
| JP | 2012-506263 | 3/2012 |
| JP | 4933046 B2 | 5/2012 |
| JP | 2012-135299 | 7/2012 |
| JP | 5041550 B2 | 10/2012 |
| JP | 2013524835 A | 6/2013 |
| JP | 2014501106 A | 1/2014 |
| JP | 2014504886 A | 2/2014 |
| JP | 2015537195 A | 12/2015 |
| JP | 2019186178 A | 10/2019 |
| KR | 20120089544 | 8/2012 |
| RU | 83387 U1 | 6/2009 |
| RU | 107026 | 8/2011 |
| WO | WO-03095005 A1 | 11/2003 |
| WO | WO2007091181 | 8/2007 |
| WO | WO-2009069518 A1 | 6/2009 |
| WO | WO2010045670 | 4/2010 |
| WO | WO2010045670 A1 | 4/2010 |
| WO | WO-201 1067877 A1 | 6/2011 |
| WO | WO2011137453 | 11/2011 |
| WO | WO2012109371 | 8/2012 |
| WO | WO-2013098395 A1 | 7/2013 |
| WO | WO-2013138384 A2 | 9/2013 |
| WO | WO-2015112750 A1 | 7/2015 |
| WO | WO-2017068099 A1 | 4/2017 |
| WO | WO-2017153443 A1 | 9/2017 |
| WO | WO-2017186455 A1 | 11/2017 |
| WO | WO-2018073376 A1 | 4/2018 |
| WO | WO-2018099999 A1 | 6/2018 |
| WO | WO-2018178095 A1 | 10/2018 |
| WO | WO-2019030000 A1 | 2/2019 |
| WO | WO-2019030168 A1 | 2/2019 |
| WO | WO-2019030353 A1 | 2/2019 |
| WO | WO-2019030360 A1 | 2/2019 |
| WO | WO-2019030361 A1 | 2/2019 |
| WO | WO-2019030364 A1 | 2/2019 |
| WO | WO-2019129552 A1 | 7/2019 |
| WO | WO-2019129553 A1 | 7/2019 |
| WO | WO-2020025701 A1 | 2/2020 |
| WO | WO-2020025712 A1 | 2/2020 |
| WO | WO-2020025714 A1 | 2/2020 |
| WO | WO-2020025718 A1 | 2/2020 |
| WO | WO-2020025719 A1 | 2/2020 |
| WO | WO-2020025725 A1 | 2/2020 |
| WO | WO-2020025727 A1 | 2/2020 |
| WO | WO-2020025728 A1 | 2/2020 |
| WO | WO-2020025730 A1 | 2/2020 |
| WO | WO-2020025731 A1 | 2/2020 |
| WO | WO-2020035454 A1 | 2/2020 |
| WO | WO-2020064683 A1 | 4/2020 |
| WO | WO-2020064684 A1 | 4/2020 |
| WO | WO-2020064685 A1 | 4/2020 |
| WO | WO-2020064686 A1 | 4/2020 |
| WO | WO-2020120551 A1 | 6/2020 |

OTHER PUBLICATIONS

Japanese Office Action, Japanese Patent Application No. 2015-537195, dated Mar. 15, 2016, 2 pages.
International Search Report dated Dec. 20, 2013 for PCT/EP2013/071069, filed Oct. 9, 2013.
International Preliminary Report on Patentability, dated Apr. 28, 2015, for PCT/EP2013/071069, filed Oct. 9, 2013.

(56) References Cited

OTHER PUBLICATIONS

Korean Office Action, Application No. 10-2015-7010071, dated Oct. 17, 2016.
Chinese Office Action, Application No. 201380054420.1, dated Sep. 26, 2016, 8 pages.
Russian Search Report dated Jul. 26, 2016, and Decision to Grant dated Aug. 24, 2016, for Russian Application No. 2015114090.
Chinese Second Office Action and Supplemental Search for Chinese Application No. 201380054420.1 dated Jun. 19, 2017.
Chinese Office Action, Application No. 201380054420.1, dated Jun. 19, 2017, 9 pages.
Japanese Search Report, Application No. 2016-227701, dated Aug. 23, 2017, 26 pages.
European Extended Search Report, Application No. 19164911.0, dated Jun. 24, 2019, 8 pages.
Korean Office Action, Application No. 10-2018-7035809, dated Jul. 24, 2019, 22 pages.
Japanese Office Action, Application No. 2018-086172, dated Feb. 3, 2020, 17 pages.
European Notice of Opposition, Application No. 13774188.0, dated Feb. 19, 2020, 95 pages.
Akbar, Muhammad et al., "Temperature compensation of piezoresistive pressure sensors" Sensors and Actuators A, vol. 33, 1992.
Mozek et al., "Digital Temperature Compensation of Capacitive Pressure Sensors" Informacije, vol. 40, 2010.
Böge/Plaßmann, "Handbuch Elektrotechnik" Wiesbaden, Germany: Vieweg Verlag, 2004, Ed. 3 ISBN: 3-528-24944-7.
Stiny, Leonhard, "Grundwissen Elektrotechnik und Elektronik" Haag a. d. Amper, Germany: SpringerVieweg, 2018, Ed. 7 ISBN: 978-3-658-18318-9.
Silicon Microstructures, Active Temperature Compensation and Calibration for MEMS pressure sensors with constant voltage.
Freescale semiconductor, integrated silicon pressure sensor on-chip signal conditioned, temperature compensated and calibrated.
Freescale semiconductor, temperature compensation methods for the Motorola X-ducer pressure sensor element.
Freescale semiconductor, 100 kPa on-chip temperature compensated and calibrated silicon pressure sensors.
Second Chinese Office Action, Application No. 201710348338.X, dated Mar. 25, 2020, 17 pages.
Japanese Decision to Grant, Application No. 2018-086172, dated Dec. 8, 2020, 5 pages.
Communication by Great Britain Application No. 2497616, dated Aug. 4, 2013, 2 pages.
Freescale Semiconductor, "Miniature I2C Digital Barometer," Pressure, MPL115A2, Retrieved from the Internet: URL: https://strawberry-linux.com/pub/MPL115A2.pdf, on Oct. 19, 2011, 8 pages.
Grounds of Appeal for European Patent No. 2908673, dated Feb. 23, 2022, 36 pages.
International Preliminary Report on Patentability for Application No. PCT/EP2020/056222, dated Sep. 23, 2021, 14 pages.
International Preliminary Report on Patentability for Application No. PCT/EP2020/056227, dated Sep. 23, 2021, 11 pages.
International Preliminary Report on Patentability for Application No. PCT/GB2017/050781, dated Feb. 27, 2018, 13 pages.
International Search Report and Written Opinion for Application No. PCT/EP2020/056227, dated Aug. 31, 2020, 19 pages.
International Search Report and Written Opinion for Application No. PCT/GB2017/050781 dated Jun. 14, 2017.
International Search Report and Written Opinion for Application No. PCT/EP2020/056222, dated Sep. 29, 2020, 25 pages.
International Search Report and Written Opinion for International Application No. PCT/EP2020/056235 dated May 29, 2020, 9 pages.
Observations by third parties for European Patent No. 2908673, dated May 26, 2021, 13 pages.
Office Action dated Mar. 14, 2022 for Russian Application No. 2021126453, 19 pages.
Search Report for Chinese Application No. 201910151850.4 dated Apr. 28, 2021, 2 pages.
Wikipedia, "Electronic Cigarette," Retrieved from the Internet: URL: https://en.wikipedia.org/w/index.php?title=Electronic_cigarette, version of Sep. 18, 2012, 17 pages.

* cited by examiner

ELECTRONIC VAPOR PROVISION DEVICE

CLAIM FOR PRIORITY

This application is the National Stage of International Application No. PCT/EP2013/071069, filed Oct. 9, 2013, which in turn claims priority to and benefit of United Kingdom Patent Application No. GB1218816.5, filed Oct. 19, 2012. The entire contents of the aforementioned applications are herein expressly incorporated by reference.

TECHNICAL FIELD

The specification relates to electronic vapour provision devices. More particularly, but not exclusively, the present specification concerns electronic vapour provision devices such as electronic cigarettes.

BACKGROUND

Electronic vapour provision devices are typically cigarette-sized and function by allowing a user to inhale a nicotine vapour from a liquid store by applying a suction force to a mouthpiece. Some electronic vapour provision devices have a pressure sensor that activates when a user applies the suction force and causes a heater coil to heat up and vaporise the liquid. Electronic vapour provision devices include electronic cigarettes.

SUMMARY

An electronic vapour provision device comprising a power cell and a computer, where the computer comprises a computer processor, a memory and an input-output means; wherein the device further comprises a pressure sensor and a temperature sensor.

Having a temperature sensor has the advantage that the device can use temperature readings to provide a more sophisticated device, implementing operations for both control and safety.

Suitably, the electronic vapour provision device is an electronic cigarette.

Suitably, the computer is a microprocessor.

Suitably, the electronic vapour provision device comprises a first end and a second end, where the first end is a mouthpiece end, the second end is a tip end and the temperature sensor is located towards the tip end. Suitably, the computer is located towards the tip end. Suitably, the pressure sensor is located towards the tip end.

By locating the temperature sensor towards the tip end of the device ensures that the sensor is the furthest distance from the mouthpiece end. Typically a vaporiser comprising a heating element is located towards the mouthpiece end so it is advantageous to keep the temperature sensor far away. This ensures that the temperature sensor is not significantly affected by the heat from the heating element, and the temperature sensor can therefore measure ambient environmental temperature more reliably. Also, a liquid store is typically located near the mouthpiece end. So locating the temperature sensor, pressure sensor and computer towards the tip end minimizes the risk of liquid interfering with these components.

Suitably, the temperature sensor is configured in use to measure ambient temperature. Suitably, pressure sensor is configured in use to measure ambient pressure. Suitably, the computer is configured in use to read both pressure and temperature at substantially the same time.

By measuring both the temperature and pressure at substantially the same time, the computer is therefore able to gain a snapshot of these values and allow for any required physical adjustments or compensations.

Suitably, the pressure sensor and temperature sensor form a combined sensor.

Suitably, the combined sensor is a calibrated sensor. Suitably, the calibrated sensor is calibrated for pressure and temperature. Suitably, the calibrated sensor is calibrated for use in atmospheric conditions.

Suitably, the combined sensor is constructed as a single electronic component.

A combined sensor ensures not only that the temperature and pressure are measured at the same time, but also at the same location. This gives a much more accurate determination of these values. A combined unit also has the advantage that only a single unit is needed leading to easier fabrication and a smaller component. Also, by using a sensor that is purposely designed to measure both temperature and pressure at the same time and location, a calibrated sensor can be used that is calibrated especially for this purpose and therefore provides a more accurate reading.

Suitably, the combined sensor is configured in use to determine the temperature and the pressure and provide a pressure reading that is dependent on the temperature. the pressure and provide a substantially linear relationship between a voltage output and the measured pressure.

Suitably, the computer is configured in use to obtain a temperature reading from the temperature sensor and pressure reading from the pressure sensor and adjust the pressure reading to compensate for the temperature reading.

Since pressure and temperature are related and affect one another, the combined sensor can be used to compensate for changes to pressure for a given temperature. Advantageously, this can be achieved by the combined sensor itself or by the computer.

Suitably, the computer is configured in use to deliver an electrical current to the heating element when a pressure measured by the pressure sensor is reduced below a threshold pressure. Suitably, the computer is configured in use to obtain a temperature reading from the temperature sensor and adjust the threshold pressure based on the temperature reading.

Given that the device is activated by a user sucking on the device and reducing the pressure past a threshold pressure, a correct pressure measurement is essential for accurate use. Thus, allowing for changes to this threshold pressure value allows for a more accurate device.

Suitably, the electronic vapour provision device comprises a control unit and a vaporiser, where the control unit comprises the power cell, the computer, the pressure sensor and the temperature sensor, and the vaporiser comprises a heating element.

Suitably, the device further comprises a liquid store, configured in use to supply liquid to the vaporiser heating element.

Suitably, the computer is configured in use such that the vaporiser vaporises a predetermined amount of liquid.

Suitably, the computer is configured in use such that the vaporiser vaporises a predetermined amount of liquid per unit time.

Suitably, the computer is configured in use such that the vaporiser vaporises substantially the same amount of liquid each time.

Suitably, the computer is configured in use such that the vaporiser vaporises substantially the same amount of liquid per unit time, each time.

Suitably, the computer is configured in use to obtain a temperature reading from the temperature sensor and adjust the vaporisation such that the vaporiser vaporises substantially the same amount of liquid per unit time, each time.

Suitably, the computer is configured in use to obtain a pressure reading from the pressure sensor and adjust the vaporisation such that the vaporiser vaporises substantially the same amount of liquid per unit time, each time.

Suitably, the computer is configured in use to obtain a temperature reading from the temperature sensor and adjust the heating temperature of the heating element based on the temperature reading.

Suitably, the computer is configured in use to obtain a pressure reading from the pressure sensor and adjust the heating temperature of the heating element based on the pressure reading.

Suitably, the computer is configured in use to obtain a temperature reading from the temperature sensor and adjust an electrical current delivered to the vaporiser based on the temperature reading.

Suitably, the computer is configured in use to obtain a pressure reading from the pressure sensor and adjust an electrical current delivered to the vaporiser based on the pressure reading.

Suitably, the computer is configured in use to reduce the heating power delivered to the heating element as the ambient temperature increases.

The heat output of the heating element is dependent on the starting temperature and the heating power. The vaporisation effect also depends on the starting temperature since this affects the viscosity of the liquid being vaporised. By measuring the starting temperature, the heating power can be controlled to provide a consistent heating and vaporisation effect.

Suitably, the computer is configured in use to enter a wait mode when the temperature reading exceeds a first threshold temperature. Suitably, the wait mode is a lower power mode compared to a normal operating mode.

Suitably, in wait mode a vaporiser cannot be activated.

Suitably, the computer is configured to remain in wait mode for a predetermined wait time.

Having a wait mode when the temperature gets too hot provides added safety for the user and ensures that the user cannot be harmed.

Suitably, prior to leaving wait mode, the computer is configured in use to measure temperature and then remain in wait mode if temperature is above a second threshold temperature, or leave wait mode if temperature is below a second threshold temperature. Suitably, the first threshold temperature is equal to second threshold temperature.

Suitably, the computer is configured in use to disable the device if temperature measured by the temperature sensor is above a critical threshold temperature. Suitably, the device further comprises a fuse connected to the computer and the device is disabled by blowing the fuse.

If the device has exceed a safe operating temperature where damage to the device could have occurred then it is advantageous to disable to device.

BRIEF DESCRIPTION OF THE DRAWINGS

For a better understanding of the disclosure, and to show how example embodiments may be carried into effect, reference will now be made to the accompanying drawings in which.

DETAILED DESCRIPTION

Figure 1:
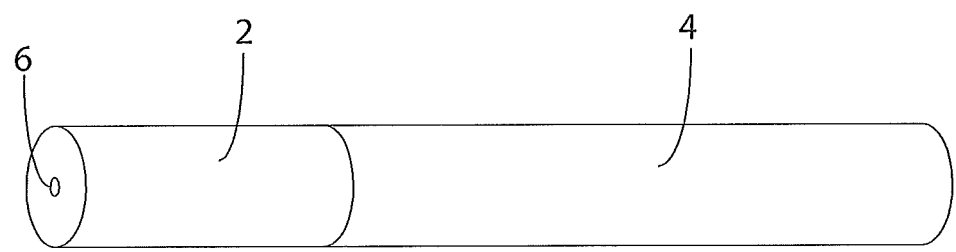
FIG. 1 is a side perspective view of an electronic vapour provision device.
Figure 2:
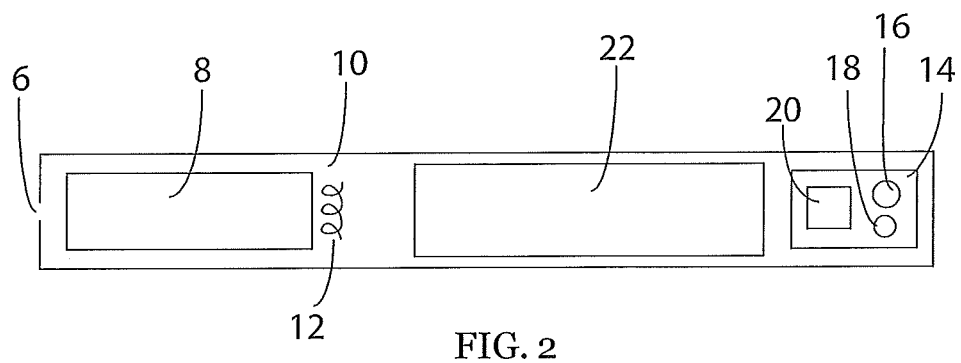
FIG. 2 is a side sectional view through the device of FIG. 1.

Referring to FIG. 1 and FIG. 2 there is a shown an electronic vapour provision device in the form of a cigarette-shaped electronic cigarette. The electronic vapour provision device has a mouthpiece 2 and a cigarette body 4. The mouthpiece 2 has an air outlet 6 at a first end and is connected to the cigarette body 4 at a second end.

Inside the electronic vapour provision device there is a liquid store 8 towards the mouthpiece end and a vaporiser 10 having a heating coil 12. The vaporiser 10 is arranged next to the liquid store 8 to allow liquid to be transferred onto the vaporiser 10 for vaporising. A circuit board 14 contains a pressure sensor 16, a temperature sensor 18 and a computer 20. A power cell 22 provides power to the device.

The general operation of the electronic vapour provision device is similar to that of known devices. When a user takes a draw on the electronic vapour provision device, a suction force is applied to the mouthpiece 2 and the air outlet 6. A reduced pressure inside the electronic vapour provision device causes the power cell 22 to provide power to the vaporiser 10 which in turn vaporises the nicotine liquid solution. The resultant vapour is then inhaled by the user.

In this example the operation of the electronic vapour provision device goes beyond that of a general device. In use, when a user applies a suction force to the electronic vapour provision device, the resultant airflow causes a drop in pressure from ambient pressure to a lower pressure, within the device. The pressure sensor 16 provides a signal to the computer 20. The computer 20 runs software that monitors the pressure signal from the pressure sensor 16 and when it determines that the pressure has been reduced below a threshold pressure, the computer 20 provides an electrical current to the heating coil 12 in order to heat the heating coil 12 and vaporise liquid from the liquid store 8.

The temperature sensor 18 is adjacent the pressure sensor 16 and also provides a temperature signal to the computer 20. The circuit board 14 containing the pressure sensor 16, temperature sensor 18 and computer 20, is located towards the tip of the device. As such, the temperature sensor 18 is located at the furthest possible point from the vaporiser 10 and heating coil 12. This ensures that the temperature sensor 18 acts to measure the ambient temperature and is not affected by the heating coil 12 as it gets hot in use.

The computer 20 receives a signal from the pressure sensor 16 and temperature sensor 18 and is able to determine both the ambient pressure and the ambient temperature at the same time. As such, since a measured pressure is dependent on the temperature at which it is measured, the computer 20 is able to adjust the pressure measurement for the given temperature. In use, the computer is then able to use this adjusted pressure and determine when the adjusted reduced pressure caused by user inhalation passes a threshold pressure value.

Alternatively, the computer 20 can obtain a value for the ambient pressure and ambient temperature and adjust the threshold pressure value to give a compensated threshold pressure. In use, the heating coil 12 is activated when the measured pressure is reduced past the compensated threshold pressure.

The computer 20 is also able to use the temperature reading for other purposes. The ambient temperature affects the vaporisation of liquid in two ways. Firstly, the viscosity of the liquid is temperature dependent and therefore the rate at which the liquid flows onto the heating coil 12 and the rate at which vaporisation occurs is somewhat dependent on the ambient temperature. Secondly, the temperature the heating coil reaches is dependent on the electrical current or power applied to the coil and also the starting temperature of the coil and the rate at which liquid is transferred to the coil, since vaporisation itself removes heat from the coil. The computer 20 is therefore able to measure the ambient temperature and adjust the current and heating power delivered to the coil to compensate for changes in ambient pressure. This therefore provides consistent vaporisation regardless of changes in the ambient temperature.

In addition, the computer 20 monitors the ambient temperature reading from the temperature sensor 18 to determine whether the device is safe for a user to operate. If the ambient temperature gets above a first safe threshold temperature then the device can enter a wait mode where the vaporiser is disabled. The device periodically measures the temperature to determine when the ambient temperature is once again safe and fallen below a second safe threshold temperature. The first and second safe threshold temperature can be the same temperature, the first can be higher than the second or the second can be higher than the first.

The temperature sensor 18 can also be used to determine when the ambient temperature exceeds a critical safe temperature. This is a temperature that can potentially cause damage to the device rendering it permanently unsafe to use. In this case the device permanently disables the device by blowing a fuse on the circuit board 14.

Figure 3:
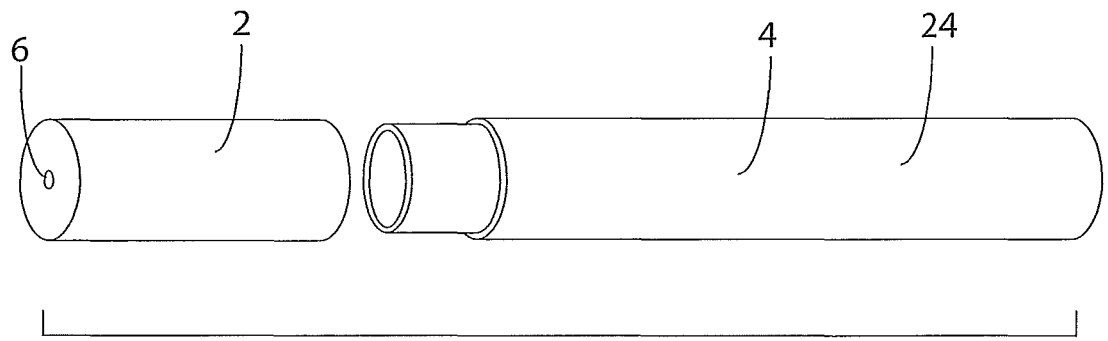
FIG. 3 is an exploded side perspective view of an electronic vapour provision device having separated mouthpiece and control unit.
Figure 4:
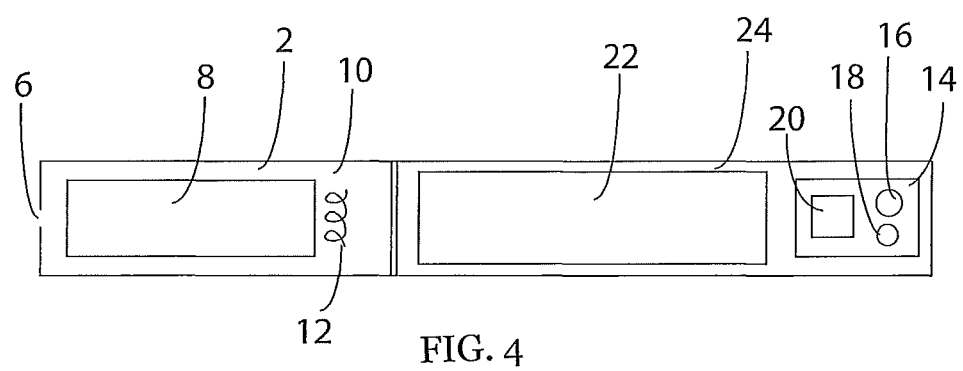
FIG. 4 is a side sectional view through the device of FIG. 3 with connected mouthpiece and control unit.

FIG. 3 and FIG. 4 show an electronic vapour provision device similar to that shown in relation to FIG. 1 and FIG. 2. The difference is that the mouthpiece 2 is releasably-attachable to the cigarette body 4. The mouthpiece comprises a female screw thread connection means, the device body 4 is a control unit 24 having a male screw thread connection means. The mouthpiece 2 and the control unit 24 can be screwed together or taken apart.

In this example, the mouthpiece 2 comprises the liquid store 8 and the vaporiser 10 with heating coil 12. The control unit 24 comprises the power cell 22 and circuit board 14 with pressure sensor 16, temperature sensor 18 and computer 20. The screw thread connection provides an electrical connection such that when the mouthpiece 2 and control unit 24 are screwed together, electrical current can be delivered to the heating coil 12 upon activation of the vaporiser 10.

Figure 5:
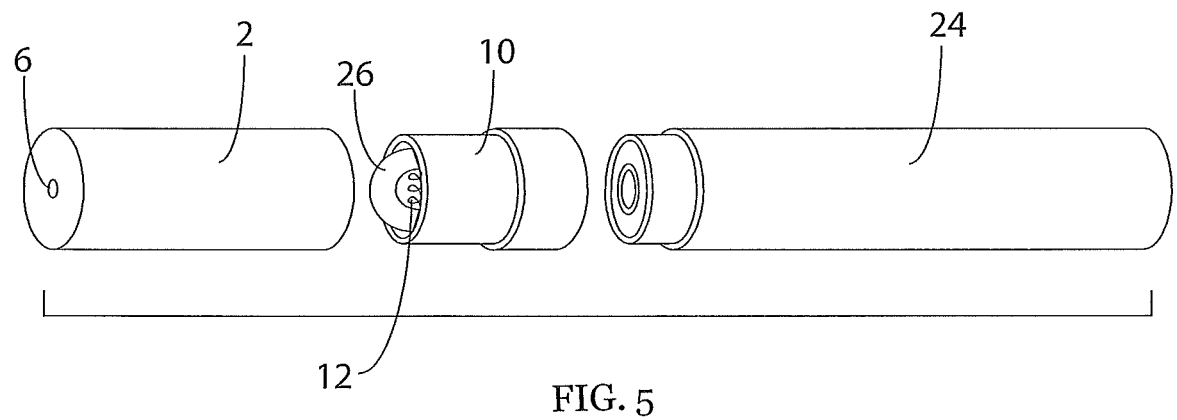
FIG. 5 is an exploded side perspective view of an electronic vapour provision device having separated mouthpiece, vaporiser and control unit.
Figure 6:
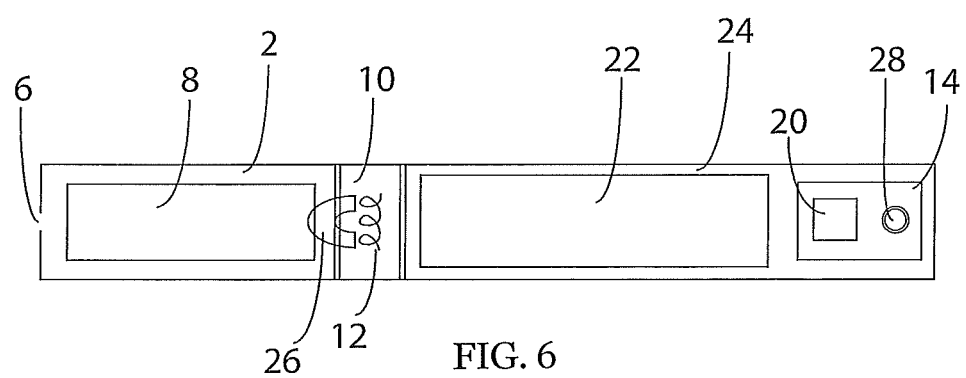
FIG. 6 is a side sectional view through the device of FIG. 5 with connected mouthpiece, vaporiser and control unit.

FIG. 5 and FIG. 6 show an electronic vapour provision device similar to that shown in relation to FIG. 3 and FIG. 4. However in this example, the vaporiser 10 is removable from the mouthpiece 2. The mouthpiece 2 has a cylindrical opening that forms an interference push-fit with the vaporiser 10. As such the mouthpiece 2 can be separated from the vaporiser 10. The mouthpiece 2 comprises the liquid store 8. The vaporiser 10 comprises the heating coil 12 and a wick 26. The wick 26 protrudes from the end of the vaporiser 10 such that when the mouthpiece 2 and the vaporiser 10 are connected, the wick 26 dips into the liquid store 8.

In use, as a user inhales on the device, liquid is transferred from the liquid store 8 and onto the wick 26 before being transferred onto the heating coil 12 for vaporisation.

The device in this example also differs from previous examples in that the temperature sensor and pressure sensor form a combined sensor 28. Thus the combined sensor 28 is a single electronic component and is connected to the computer. The combined sensor 28 is able to provide simultaneous readings of both temperature and pressure to the computer 20. The combined sensor 28 is a calibrated sensor in that it has been calibrated to provide accurate pressure and temperature signals dependent on one another. As such the sensor itself is able to provide an adjusted pressure reading that compensates for temperature variations.

The pressure sensor 16 and/or the combined pressure and temperature sensor 28, is suitably sufficiently sensitive to be able to operate according to the required parameters described above. In this regard, the sensor may have a sensitivity of around +/−5 Pa, and may have a sensitivity of +/−3 Pa, and more suitably may have a sensitivity of +/−1 Pa. Given that standard atmospheric pressure is in the order of around 100,000 Pa, it is clear that the sensor 16/28 is highly sensitive. The degree of sensitivity may be provided by the hardware used in the sensor itself, and also the compensatory algorithm provided by the sensor which is loaded onto the computer 20. In use, the sensor provides raw pressure data, and raw temperature data may be provided either by the separate temperature sensor 18 or by the combined pressure and temperature sensor 28. This is fed to the computer 20 which calculates the pressure compensated for the temperature. However, in an alternative embodiment, the sensors 16, 18, 28 may comprise an internal microprocessor such that the sensors 16, 18, 28 themselves may be able to provide the compensated reading as a direct output. The temperature and pressure sensor 18, 16, or combined temperature and pressure sensor 28, are also present as a combination, i.e. on one circuit board 14. This is advantageous within an electronic vapour provision device because the temperature profile may vary across such devices for a number of reasons—for example, the heater being on, holding of the device etc. The output from the sensor(s) 16, 18, 28 is also digital, which is advantageous in the context of the device as a whole.

Within the devices described above, temperature can be independently monitored at the same time as providing compensatory data for the pressure reading. This is because the sensor(s) provide raw temperature and pressure outputs. This enables the sensor(s) to also act as a safety component in that it/they can provide information to the computer about the temperature of the device which can then signal a cut-out at certain pre-determined temperatures, for example 50 degrees Celcius.

The compensated pressure reading is also important. For regulatory purposes, it is advantageous that the device does not operate inadvertently—such as when the device is not in the mouth, or even when the device is in the mouth of a user but they are not intentionally inhaling. One way of achieving this is by setting defined pressure thresholds and ensuring that they are not "breached" as a result of a faulty sensor.

Figure 7:
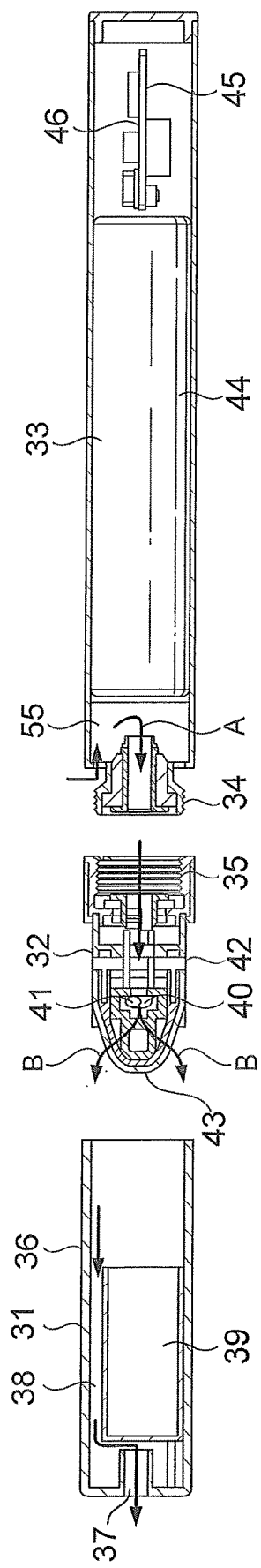
FIG. 7 is an exploded longitudinal sectional view of another embodiment of an electronic vapour provision device similar to that of FIGS. 3 and 4, and that of FIGS. 5 and 6, showing the internal components thereof in greater detail.
Figure 8:
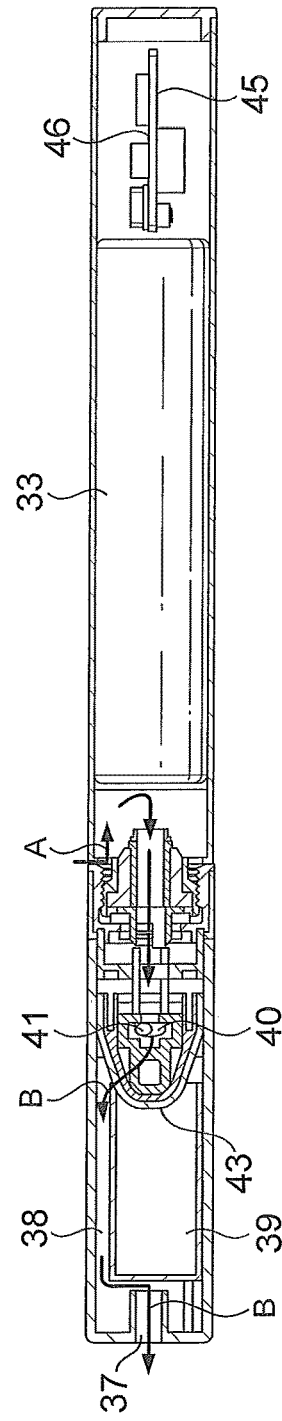
FIG. 8 is a sectional view of the electronic vapour provision device of FIG. 7 when assembled.

FIGS. 7 and 8 illustrate another embodiment of an electronic vapour provision device in the form of an electronic cigarette. The device is similar to the embodiment shown in FIGS. 3 and 4, and the embodiment shown in FIGS. 5 and 6, although the embodiment in FIGS. 7 and 8 shows the internal components thereof in greater detail. The device comprises a mouthpiece 31, vaporiser device 32 and control unit 33 which can be assembled as shown in FIG. 8 to provide a generally cylindrical device that can be used as a substitute for a conventional tobacco burning cigarette. The control unit 33 is provided with a threaded extension 34 that is received in an interior thread 35 in the vapour device 32. The mouthpiece 31 comprises a generally cylindrical plastics casing 36 that can be push-fitted on to the vapour device 32.

The mouthpiece 31 has an outlet 37 to supply vapour to the mouth of the user and an outlet passageway 38 for the vapour which, in use is produced by the vapour device 32. The mouthpiece 31 also includes a liquid reservoir comprising a porous storage matrix 39 such as plastics open foam material impregnated with a vaporisable liquid, such as a nicotine containing liquid that in use is vaporised by the vapour device 32. The matrix 39 acts as a reservoir for the liquid and since the mouthpiece 31 is readily removable and replaceable, it can be used as a refill capsule when the liquid in the porous matrix 39 becomes depleted and needs to be replenished.

The vapour device 32 includes an electronic heating coil 40 that is wound around a ceramic core 41, supported on a ceramic base 42. A generally U-shaped wicking member 43 is configured to wick liquid from the reservoir 39 towards the heating element 40 by capillary action. The wicking member 43 may for example by made of a metallic foam such as nickel foam.

The heater coil 40 is powered by a rechargeable battery 44 located in the control unit 33 through electrical contacts 48, 49 (not shown in FIGS. 7 and 8, see FIG. 9) which electrically couple the heater coil to the battery 44 when the control unit 33 is fitted to the vapour device 32 by the engagement of threads 34, 35. The electrical power of the battery 44 is supplied to the heater coil 40 under the control of a control circuit 45 mounted on circuit board 46 within the control unit 33.

Figure 9:
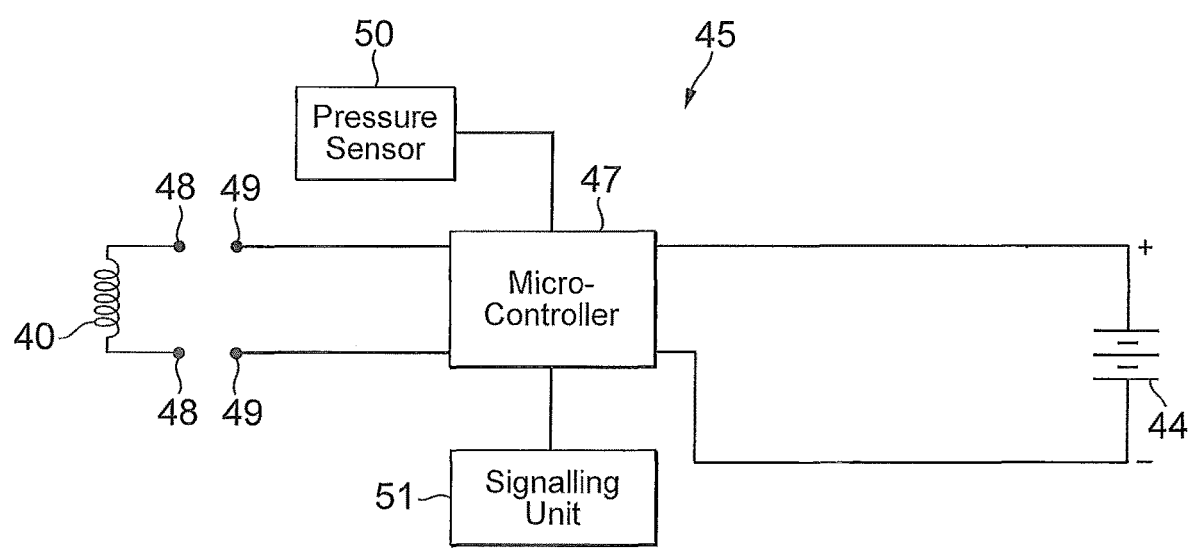
FIG. 9 is a schematic circuit diagram of the vapour provision device of FIGS. 7 and 8.

As shown in FIG. 9, the control circuit 45 includes a micro controller 47 powered by battery 44 to supply an electric heating current to the coil 40 through the contacts 48, 49 that are brought into electrical connection when the control unit 33 is threadedly engaged with the vapour device 32 by means of threads 34, 35 shown in FIG. 7.

A pressure sensor 50 detects when a user draws on the mouthpiece 38, as described in more detail hereinafter.

Also, a signalling unit 51 is provided to provide audio or visual outputs to the user indicative of operational conditions of the device. For example, the signalling device may include a light emitting diode that glows red when the user draws on the device. The signalling device may provide predetermined audio or visual signals to indicate for example that the battery 44 needs to be recharged.

The supply of current from the battery 44 to the mouth controller is controlled by switching transistor 52.

When the user draws on the mouthpiece 1 so as to draw vapour through the outlet 37, the pressure sensor 50 detects the drop in pressure which is communicated from within the vapour device 32 through the interior of the control unit 33 to the circuit board 45. Microcontroller 47 responds to the pressure drop detected by the sensor 50 to supply electrical current to the heater coil 40, which vaporises liquid supplied by capillary action through the U-shaped wicking member 43. An air inlet passageway 55 is provided in the joint between the vapour unit 32 and control unit 33 so that air can be drawn through the threaded extension 34 of the control unit 33 into the vapour device 32 in the direction of arrows A, so that the resulting vapour is drawn in the direction of arrows B through passageway 38 to the outlet 37.

The operation of the device of FIGS. 7 and 8 may be the same as that of the devices of FIGS. 1 to 6 described previously and so a detailed description of such operation will not be repeated here. However, it is intended that the control circuit 46 of the embodiment of FIGS. 7 and 8 may be configured as per the circuit board 14 of the embodiments of FIGS. 1 to 6, and vice versa. Specifically, the circuit board 46 may comprise a temperature sensor 18, or a combined temperature and pressure sensor 28. Also, the pressure sensor 50 may be disposed on the circuit board 46 within the control unit 33 and the vapour device 32 may be in fluid communication with the area within the control unit 33, via an open passageway for example (not shown), such that a drop in pressure within the vapour device 32 is detectable by a pressure sensor on the circuit board 46 within control unit 33. Also, the microcontroller 47 of the embodiment of FIGS. 7 and 8 may be programmed as per the computer 20 of the embodiment of FIGS. 1 to 6 to monitor both measured temperature and pressure from the sensor(s) to control the device accordingly and as described previously.

Although examples have been shown and described it will be appreciated by those skilled in the art that various changes and modifications might be made without departing from the scope of the invention. The computer processor could be a microprocessor or a microcontroller. The device is not restricted to being cigarette shaped. The computer processor, temperature sensor and pressure sensor are not restricted to being on the same circuit board. The heating coil used for vaporisation could be replaced by another type of non-coil heating element.

In order to address various issues and advance the art, the entirety of this disclosure shows by way of illustration various embodiments in which the claimed invention(s) may be practiced and provide for superior electronic vapour provision devices. The advantages and features of the disclosure are of a representative sample of embodiments only, and are not exhaustive and/or exclusive. They are presented only to assist in understanding and teach the claimed features. It is to be understood that advantages, embodiments, examples, functions, features, structures, and/or other aspects of the disclosure are not to be considered limitations on the disclosure as defined by the claims or limitations on equivalents to the claims, and that other embodiments may be utilised and modifications may be made without departing from the scope and/or spirit of the disclosure. Various embodiments may suitably comprise, consist of, or consist essentially of, various combinations of the disclosed elements, components, features, parts, steps, means, etc. In addition, the disclosure includes other inventions not presently claimed, but which may be claimed in future. Any feature of any embodiment can be used independently of, or in combination with, any other feature.

The invention claimed is:

1. An electronic vapor provision device comprising:
   a power cell;
   a heating element;
   a computer, the computer including a computer processor, a memory and an input-output; and a pressure sensor and a temperature sensor that form a combined sensor, constructed as a single electronic component, wherein the combined sensor is configured to detect a suction force applied to the electronic vapor provision device by a user, and the combined sensor configured to, in use, output both pressure and temperature at substantially the same time, and the computer configured to deliver an electrical current to the heating element when a pressure measured by the pressure sensor is reduced below a threshold pressure, wherein the computer is configured, in use, to obtain a temperature reading from the temperature sensor and a pressure reading from the pressure sensor, and to adjust the pressure reading to compensate for the temperature reading, wherein the combined sensor is located at a position away from the heating element such that the output of the combined sensor is substantially unaffected by operation of the heating element, and wherein, on the basis of the temperature reading from the combined sensor, the computer is configured to cut out the electrical current to the heating element at or above a predetermined temperature.

2. The electronic vapor provision device of claim 1, wherein the electronic vapor provision device is an electronic cigarette.

3. The electronic vapor provision device of claim 1, wherein the computer includes a microprocessor.

4. The electronic vapor provision device of claim 1, wherein the electronic vapor provision device further comprises a first end and a second end, wherein the first end is a mouthpiece end and the second end is a tip end, and the combined sensor is located closer to the tip end than to the mouthpiece end.

5. The electronic vapor provision device of claim 4, wherein the computer is located closer to the tip end than to the mouthpiece end.

6. The electronic vapor provision device of claim 1, wherein the temperature sensor is configured to, in use, measure ambient temperature.

7. The electronic vapor provision device of claim 1, wherein the pressure sensor is configured, in use, to measure ambient pressure.

8. The electronic vapor provision device of claim 1, wherein the combined sensor is a calibrated sensor.

9. The electronic vapor provision device of claim 8, wherein the calibrated sensor is calibrated for pressure and temperature.

10. The electronic vapor provision device of claim 8, wherein the calibrated sensor is calibrated for use in atmospheric conditions.

11. The electronic vapor provision device of claim 1, wherein the combined sensor is configured to, in use, determine the temperature and the pressure and provide a substantially linear relationship between a voltage output and the measure pressure.

12. The electronic vapor provision device of claim 1, wherein the computer is configured, in use, to obtain a temperature reading from the temperature sensor and to adjust the threshold pressure based on the temperature reading.

13. The electronic vapor provision device of claim 1, wherein the electronic vapor provision device comprises a control unit and a vaporizer, the control unit comprising the power cell, the computer, the pressure sensor and the temperature sensor, and the vaporizer comprising the heating element.

14. The electronic vapor provision device of claim 1, wherein the electronic vapor provision device further comprises a liquid store configured, in use, to supply liquid to the heating element.

15. The electronic vapor provision device of claim 14, wherein the computer is further configured, in use, to adjust the vaporization such that the vaporizer vaporizes substantially the same amount of liquid per unit time, each time.

16. The electronic vapor provision device of claim 14, wherein the computer is further configured, in use, to adjust the vaporization such that the vaporizer vaporizes substantially the same amount of liquid per unit time, each time.

17. The electronic vapor provision device of 14, wherein the computer is further configured, in use, to adjust a heating temperature of the heating element based on the temperature reading.

18. The electronic vapor provision device of claim 14, wherein the computer is further configured, in use, to adjust a heating temperature of the heating element based on the pressure reading.

19. The electronic vapor provision device of claim 14, wherein the computer is further configured, in use, to adjust an electrical current delivered to the vaporizer based on the temperature reading.

20. The electronic vapor provision device of claim 14, wherein the computer is further configured, in use, to adjust an electrical current delivered to the vaporizer based on the pressure reading.

21. The electronic vapor provision device of claim 14, wherein the computer is configured, in use, to reduce a heating power delivered to the heating element as an ambient temperature increases.

22. The electronic vapor provision device of claim 1, wherein the computer is configured, in use, to enter a wait mode when the temperature reading exceeds a first threshold temperature.

23. The electronic vapor provision device of claim 22, wherein prior to leaving wait mode, the computer is configured, in use, to measure a temperature and to then remain in wait mode if the temperature is above a second threshold temperature, or to leave wait mode if the temperature is below a second threshold temperature.

24. The electronic vapor provision device claim 23, wherein the first threshold temperature is substantially equal to second threshold temperature.

25. The electronic vapor provision device of claim 1, wherein the computer is configured, in use, to disable the device if a temperature measured by the temperature sensor is above a critical threshold temperature.

26. The electronic vapor provision device of claim 25, wherein the device further comprises a fuse connected to the computer, and the device is configured to be disabled by blowing the fuse.

* * * * *